(12) United States Patent
Spear et al.

(10) Patent No.: US 6,791,958 B2
(45) Date of Patent: Sep. 14, 2004

(54) METHOD OF ROUTING CONTROL INFORMATION AND BEARER TRAFFIC BETWEEN A WIRELESS COMMUNICATIONS DEVICE AND INFRASTRUCTURE EQUIPMENT

(75) Inventors: Stephen Spear, Skokie, IL (US); Sanjay Gupta, Lakewood, IL (US); Richard Corrigan, San Diego, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/068,445

(22) Filed: Feb. 6, 2002

(65) Prior Publication Data

US 2003/0147406 A1 Aug. 7, 2003

(51) Int. Cl.[7] ................................................ H04L 12/28
(52) U.S. Cl. ...................................... 370/331; 370/401
(58) Field of Search ................................ 370/310, 328, 370/329, 331, 338, 352, 401, 410; 455/422, 432, 435, 436, 445, 552, 560; 379/220.01, 221.09, 221.1, 221.12, 229, 230

(56) References Cited

U.S. PATENT DOCUMENTS

| | | | | |
|---|---|---|---|---|
| 5,636,217 A | * | 6/1997 | Moelard | ...................... 370/338 |
| 6,104,929 A | | 8/2000 | Josse et al. | |
| 6,125,276 A | | 9/2000 | Lupien | |
| 6,233,458 B1 | * | 5/2001 | Haumont et al. | ............ 455/445 |
| 6,256,300 B1 | * | 7/2001 | Ahmed et al. | .............. 370/331 |
| 6,438,370 B1 | * | 8/2002 | Einola et al. | ............. 455/422.1 |
| 6,519,235 B1 | * | 2/2003 | Kim et al. | ................... 370/331 |
| 2001/0019544 A1 | * | 9/2001 | Bakke et al. | ............... 370/331 |
| 2001/0048673 A1 | * | 12/2001 | Verkama et al. | .......... 3700/329 |
| 2002/0015391 A1 | * | 2/2002 | Kriaras et al. | ............. 370/328 |
| 2002/0052180 A1 | * | 5/2002 | Ravishankar et al. | ...... 455/12.1 |

OTHER PUBLICATIONS

3GPP TS 12.121 "Technical Specification Group Services and Systems Aspects; Architectural Requirements for Release 1999" V3.6.0; Jun. 2002.

* cited by examiner

*Primary Examiner*—Huy D. Vu
*Assistant Examiner*—Daniel Ryman
(74) *Attorney, Agent, or Firm*—Lalita W. Pace

(57) ABSTRACT

A method of routing control information and bearer traffic in a packet network. When a wireless communication device has established a connection in a coverage area serviced by an Access Network Controller (ANC) and a Serving Node and roams into an area serviced by a new ANC and a new Serving Node, the present invention routes control information to and from the device through the anchor Serving Node (Serving Node through which the connection was established). Bearer traffic is routed to and from the device through the ANC and Serving Node serving the area in which the wireless communication device is located.

7 Claims, 4 Drawing Sheets

METHOD OF ROUTING CONTROL INFORMATION AND BEARER TRAFFIC BETWEEN A WIRELESS COMMUNICATIONS DEVICE AND INFRASTRUCTURE EQUIPMENT

FIELD OF THE INVENTION

The present invention relates generally to the field of communication systems, and more particularly, to systems implementing packet data technologies.

BACKGROUND OF THE INVENTION

A network architecture for routing control (signaling) information and bearer traffic in a packet network system is shown in the functional block diagram of FIG. 1. In the diagram, the flow of control information is shown using dashed lines, the flow of bearer traffic is shown using thin solid lines and the flow of control information and bearer traffic is shown using thick solid lines. When a subscriber is in a first coverage area (A1) and requests a service either manually or automatically on powering up his or her wireless communication device, such as mobile station (MS) 108, certain information about that subscriber is communicated to infrastructure equipment. In particular, the information is communicated to a First Serving Node 104 via a First Access Network Controller (ANC) 106. This process is generally referred to as establishing a connection. After a connection is established and while the MS 108 remains in the first coverage area, control and bearer traffic transmitted from the MS 108 is routed through the First ANC 106 to the First Serving Node 104. The First Serving Node 104 processes the control information and forwards the bearer traffic to an appropriate Gateway Node 102 for processing. Control and bearer traffic entering the system through an appropriate Gateway Node 102 is transmitted to the MS 108 through the First Serving Node 104 and First ANC 106.

As the MS 108 roams from the first coverage area into a new coverage area (A2) serviced by a new serving node, Second Serving Node 110, all control and bearer traffic from and to the MS 108 for the existing connection is routed through the new serving node. However, because the Second Serving Node 110 did not establish the connection, it must obtain information about the MS 108 from the First Serving Node 104 where the connection was established in order to process the signaling information. The node where the connection was established is referred to herein as the anchor node. MS information for a particular connection is maintained at the anchor node to provide simplicity in billing and charging, legal intercept (i.e. wiretapping), Gateway nodes and handover procedures, to name a few. For example, most carriers perform billing and charging functions at the control point (where the connection is established) to minimize complexity and maximize efficiency.

Thus, there is a need for an improved method of routing control information and bearer traffic in a packet network system.

DETAILED DESCRIPTION OF THE DRAWINGS

Figure 1:
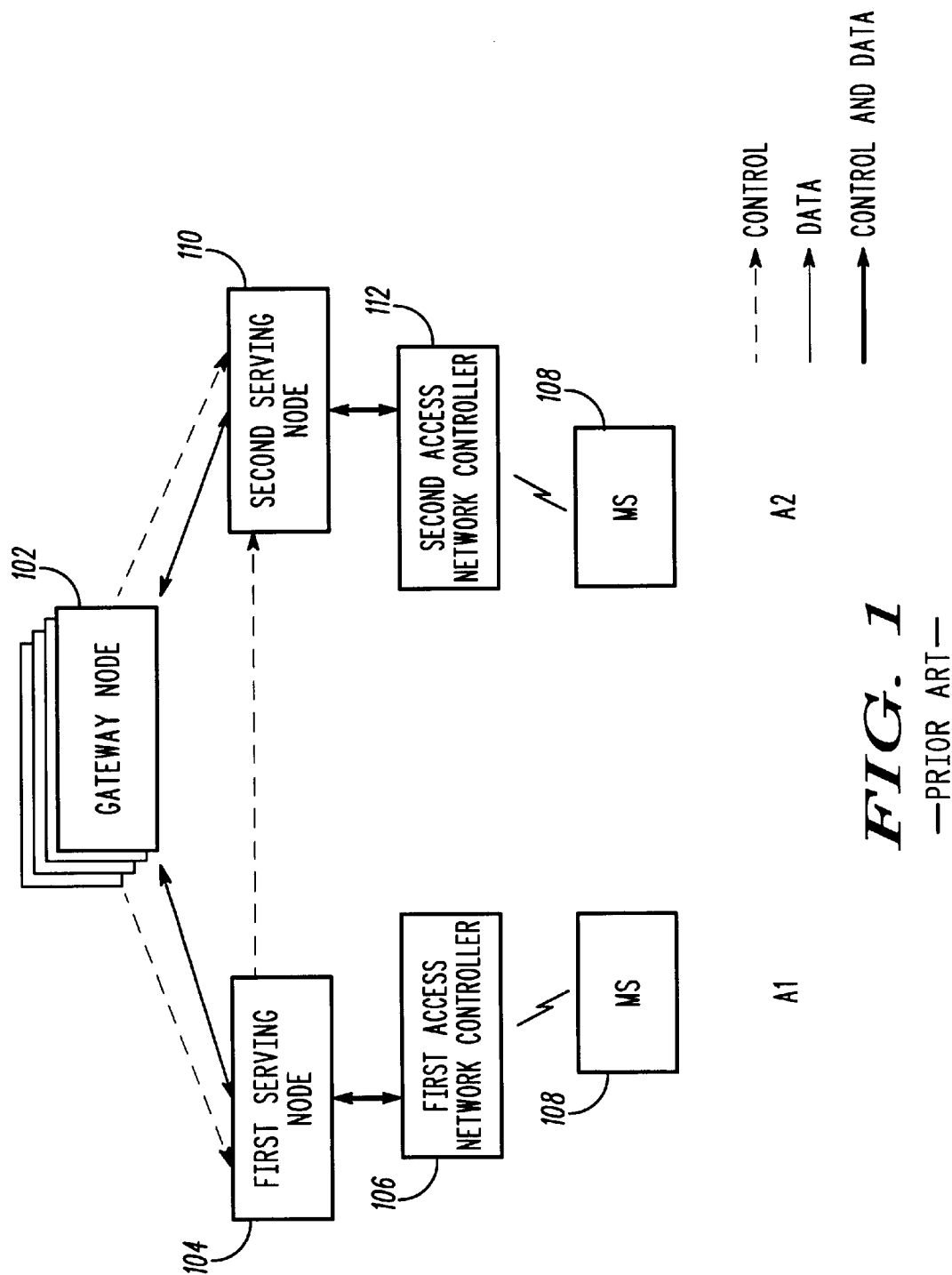
FIG. 1 is a functional block diagram of a network architecture for routing control information and bearer traffic in a packet network system according to known protocols.

The present invention provides an improved method of routing control information and bearer traffic in a packet network. In particular, the invention provides a method of routing control information and bearer traffic transmitted by a wireless communication device to infrastructure equipment when the infrastructure equipment is different than that through which a current connection was established. A system that can implement the present invention is a Universal Mobile Telecommunication System (UMTS). For simplicity of explanation, the invention will be described with reference to elements in a UMTS system. In a UMTS system, the ANC 106, 112 is called a Radio Network Controller (RNC), the Serving Node 104, 110 is called a Serving General Packet Radio Service Support Node (SGSN), and the Gateway Node 102 is called a Gateway GPRS Support Node (GGSN). The RNC, SGSN and GGSN perform functions similar to the ANC 106, 112; Serving Node 104, 110; and Gateway Node 102, respectively. The functions are described in Section 4 of 3GPP TS 23.060 v4.0.0 (2001–2003), which is herein incorporated by reference. A copy of 3GPP TS 23.060 may be obtained via a World Wide Web site located at www.3gpp.org. It will be recognized by one of ordinary skill in the art that the invention may be used in any system wherein packet data is transmitted or received. An RNC, SGSN and GGSN that can be used to implement the present invention are known in the art and not further described herein.

When a MS has established a connection in a coverage area serviced by a first ANC and a First Serving Node and roams into an area serviced by a new ANC and a new Serving Node, the present invention provides a method of routing control information and bearer traffic transmitted by the MS to the appropriate infrastructure equipment. In accordance with the invention, control is routed to the original Serving Node, referred to as the anchor Serving Node and bearer traffic is routed to the appropriate Gateway Node. With reference to elements in a UMTS system, in a first embodiment of the present invention, the new RNC routes control to the anchor SGSN, either directly or through the new SGSN, and routes bearer traffic directly to the appropriate GGSN. In a second embodiment, the new RNC routes both control and bearer traffic to the new SGSN. The new SGSN forwards the control to the anchor SGSN for processing and transmits the bearer traffic to the appropriate Gateway Node. In a third embodiment, the new RNC routes control information directly to the anchor SGSN and routes the bearer traffic to the new SGSN, which then transmits the bearer traffic to the appropriate GGSN. Embodiments of the present invention have been generally described with respect to uplink communications from the MS to the infrastructure equipment. The invention is equally applicable to downlink communications from the infrastructure equipment to the MS as described in detail in the following paragraphs.

The present invention anchors the processing of control information at the SGSN through which the connection was established. The invention thereby eliminates the need for a new SGSN to obtain information about the MS from the anchor SGSN. A detailed explanation of the embodiments of the present invention will now be described with reference to FIGS. 2–4. For simplicity of explanation, the embodiments assume a one-to-one correspondence between a SGSN and an RNC in a coverage area. It should be recognized that a coverage area may include an SGSN in communication with multiple RNCs, such that movement of the MS resulting in communication with a different RNC does not necessarily result in communication with a different SGSN.

Figure 2:
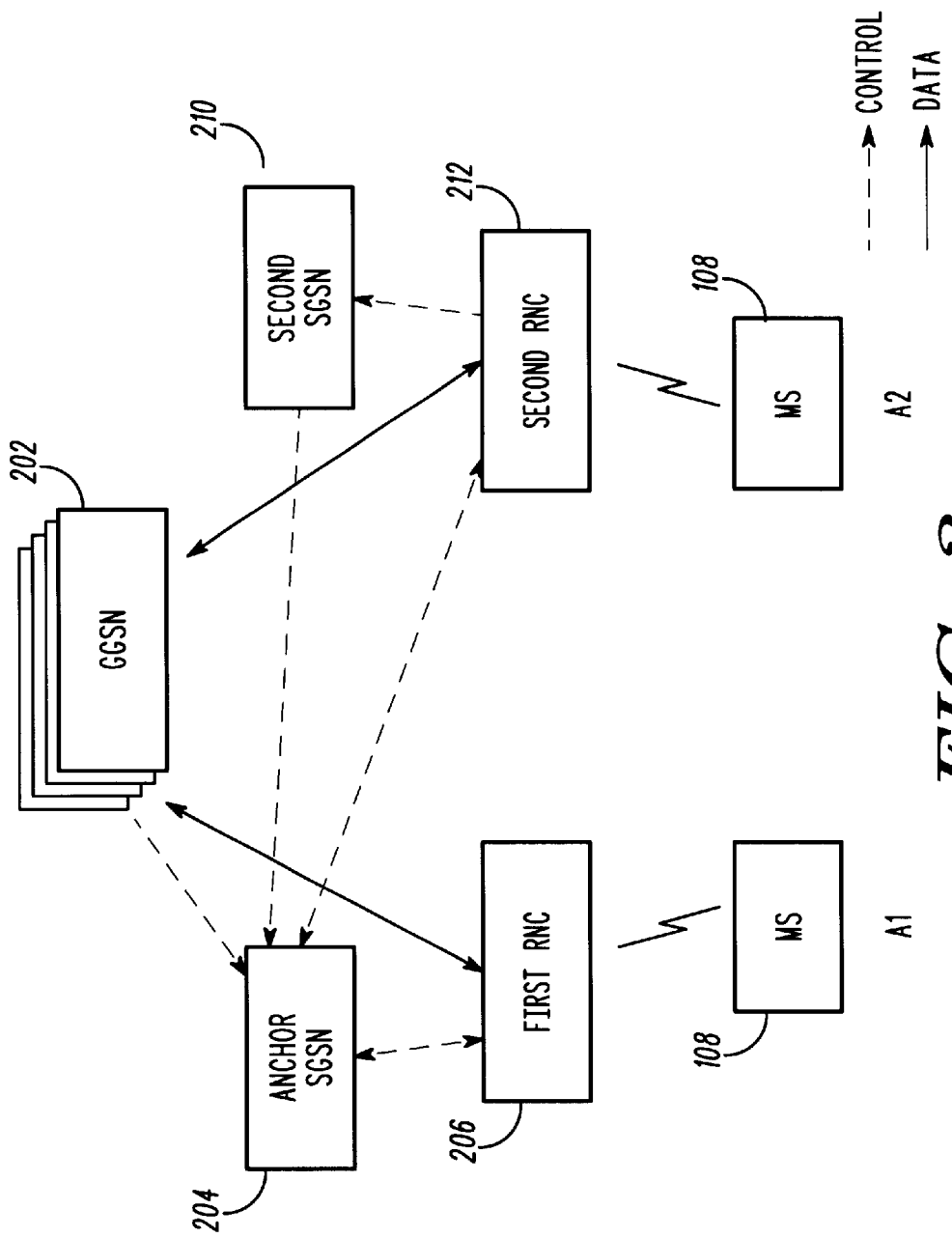
FIG. 2 is a functional block diagram of a network architecture for routing control information and bearer traffic in a packet network system in accordance with a first embodiment of the present invention.

Referring to FIG. 2, a UMTS architecture that can implement a first embodiment of the method of routing control information and bearer traffic in a packet data system is shown. FIG. 2 shows the uplink and downlink flow of information through the system in accordance with the first embodiment of the method. The MS 108 establishes a connection through a first RNC 206 and an anchor SGSN 204. (First RNC 206 communicates with the MS 108 through a base transceiver station (not shown) as known in the art.) As long as the MS 108 remains in the first coverage area, A1, control information transmitted by the MS 108 is forwarded by the first RNC 206 to the anchor SGSN 204. Bearer traffic received from the MS 108 is transmitted to the appropriate GGSN 202 for routing to the ultimate destination. When the MS 108 has roamed into a different coverage area, such as A2, control information and bearer traffic transmitted by the MS 108 is received by a second RNC 212 (via a base transceiver station (not shown)). The second RNC 212 forwards the control information to the anchor SGSN 204 for processing, either directly or through the second SGSN 210. The second RNC 212 transmits the bearer traffic to the appropriate GGSN 202 for routing to the ultimate destination. The second SGSN 210 does not process the control information from the MS 108 because it did not establish the current MS connection and does not have the necessary information about the MS 108. In the first embodiment of the present invention, the RNC 206, 212 performs the function of splitting control information and bearer traffic and forwarding them to the appropriate network element.

The first embodiment of the present invention is also applicable in the downlink direction. Control information and bearer traffic enter the system through the appropriate GGSN 202. The GGSN 202 transmits the control information to the anchor SGSN 204. The anchor SGSN 204 transmits the control information to the appropriate RNC 206 or 212 depending on where the MS 108 is currently located. The GGSN 202 transmits the bearer traffic to the appropriate RNC 206 or 212 depending on where the MS 108 is currently located (A1 or A2). The control information and bearer traffic is then transmitted from the RNC 206 or 212 to the MS 108.

Figure 3:
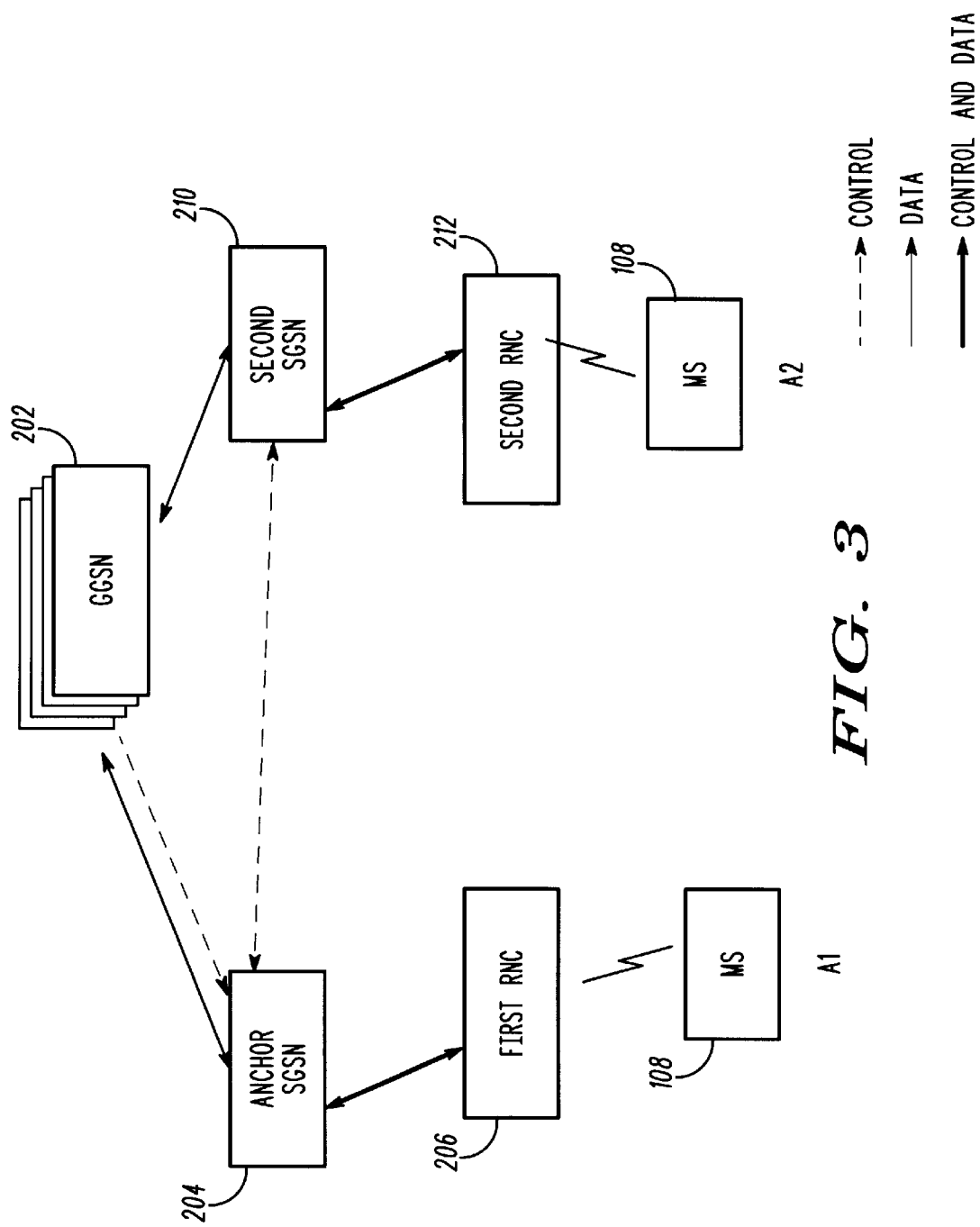
FIG. 3 is a functional block diagram of a network architecture for routing control information and bearer traffic in a packet network system in accordance with a second embodiment of the present invention.

Referring to FIG. 3, a UMTS architecture that can implement a second embodiment of the method of routing control information and bearer traffic in a packet data system is shown. FIG. 3 shows the uplink and downlink flow of information through the system in accordance with the second embodiment of the method. The second embodiment of the invention utilizes the same system structure as that previously described with reference to FIG. 2, with like elements identified using the same reference numerals. However, in the second embodiment, the SGSN 204, 210 performs the function of splitting control information and bearer traffic and forwarding them to the appropriate network element. In particular, as long as the MS 108 remains in A1, control information and bearer traffic transmitted by the MS 108 is forwarded by the first RNC 206 to the anchor SGSN 204. The SGSN 204 processes the control information and transmits the bearer traffic to the appropriate GGSN 202 for routing to the ultimate destination. When the MS 108 roams into a different coverage area, control information and bearer traffic transmitted by the MS 108 is received by a second RNC 212. The second RNC 212 forwards the control information and bearer traffic to the second SGSN 210. The second SGSN 210 forwards the control information to the anchor SGSN 204 and transmits the bearer traffic to the appropriate GGSN 202 for routing to the ultimate destination.

In the downlink direction, control information and bearer traffic enter the system through the appropriate GGSN 202. When the MS 108 is in coverage area A1, the GGSN 202 transmits the control information and bearer traffic to the anchor SGSN 204. The anchor SGSN 204 transmits the control information and bearer traffic to the first RNC 206, which in turn transmits the control information and bearer traffic to the MS 108. When the MS 108 has roamed into coverage area A2, the GGSN transmits control information to the anchor SGSN 204 and bearer traffic to the second SGSN. The anchor SGSN 204 transmits the control information to the second SGSN 210. The second SGSN 210 transmits the control information and the bearer traffic to the RNC 212, which in turn transmits the control information and bearer traffic to the MS 108.

Figure 4:
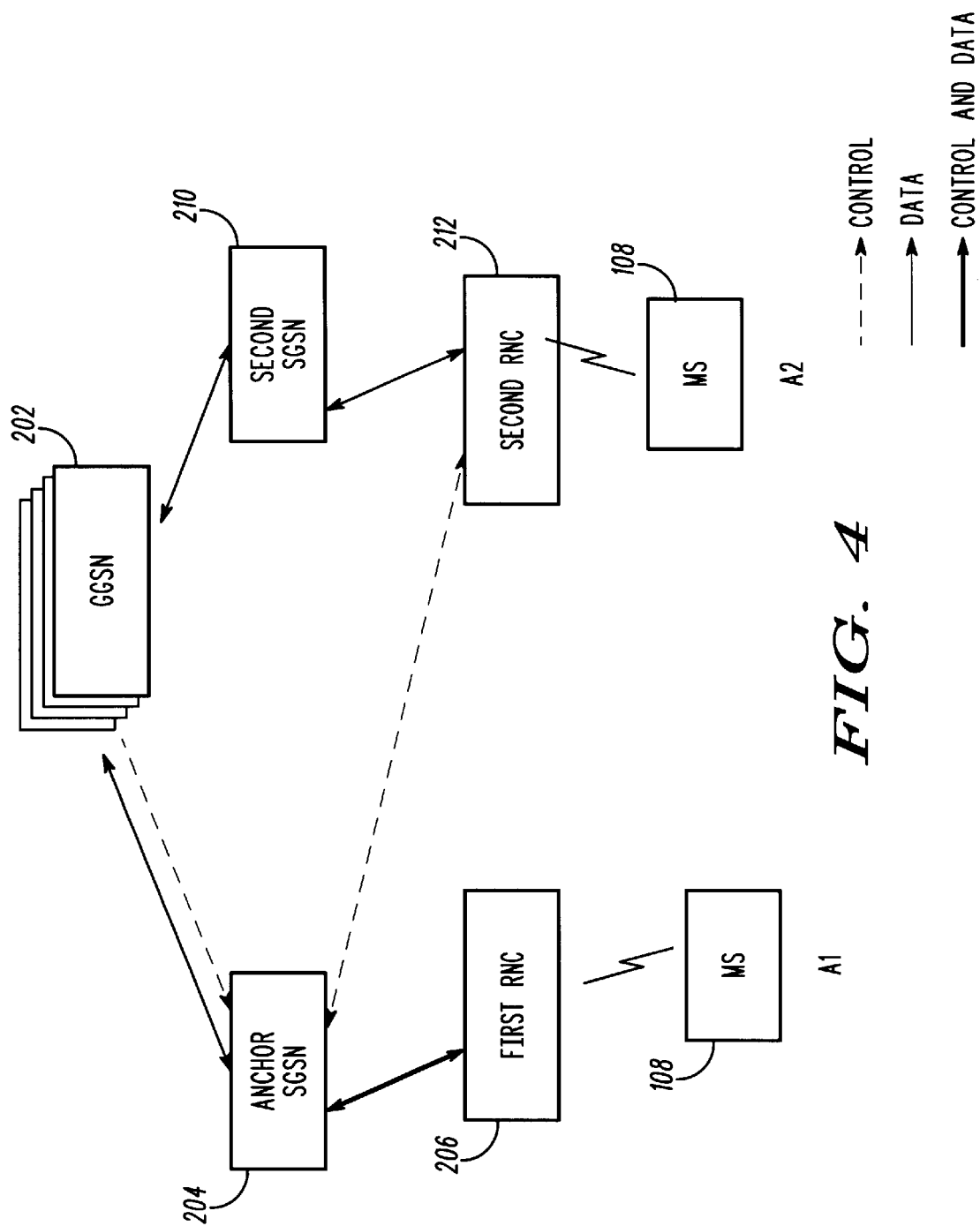
FIG. 4 is a functional block diagram of a network architecture for routing control information and bearer traffic in a packet network system in accordance with a third embodiment of the present invention.

Referring to FIG. 4, a UMTS architecture that can implement a third embodiment of the method of routing control information and bearer traffic in a packet data system is shown. FIG. 4 shows the uplink and downlink flow of information through the system in accordance with the third embodiment of the method. The third embodiment of the invention utilizes the same system structure as that previously described with reference to FIG. 2, with like elements identified using the same reference numerals. However, in the third embodiment, the RNC 206, 212 and the SGSN 204, 210 share the function of splitting control information and bearer traffic and forwarding them to the appropriate network element. In particular, as long as the MS 108 remains in A1, control information transmitted by the MS 108 is forwarded by the first RNC 206 to the anchor SGSN 204 for processing. The first RNC 206 also forwards bearer traffic transmitted by the MS 108 to the SGSN 204. The SGSN 204 transmits the bearer traffic to the appropriate GGSN 202 for routing to the ultimate destination and processes the control information. When the MS 108 roams into a different coverage area, control information and bearer traffic transmitted by the MS 108 is received by a second RNC 212. The second RNC 212 transmits the control information directly to the anchor SGSN 204 and forwards the bearer traffic to the second SGSN 210. The second SGSN 210 transmits the bearer traffic to the appropriate GGSN 202 for routing to the ultimate destination.

In the downlink direction, control information and bearer traffic enter the system through the appropriate GGSN 202. The GGSN transmits the control information to the anchor SGSN 204. The anchor SGSN 204 transmits control information to the appropriate RNC 206 or 212 depending on where the MS 108 is currently located. The RNC 206 or 212 transmits the control information to the MS 108. The GGSN 202 transmits the bearer traffic to the appropriate SGSN 204 or 210 depending on where the MS 108 is currently located (A1 or A2). The SGSN 204 or 210 transmits the bearer traffic the appropriate RNC 206 or 212, which in turn transmits the bearer traffic to the MS 108.

Independently controlling the flow of control information and bearer traffic during a connection such that the control information remains anchored at the Serving Node through which the connection was established provides several advantages. The method streamlines bearer traffic (as traffic takes the shortest route to the destination), improves the quality of service (QoS) by reducing packet loss and delay since fewer hops (routers) have to be traversed, and provides service continuity, i.e. services that are being provided by an SGSN are not interrupted.

While the invention may be susceptible to various modifications and alternative forms, a specific embodiment has been shown by way of example in the drawings and has been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. In infrastructure equipment comprising a gateway node, a first access network controller and a first serving node serving a first coverage area and a second access network controller and a second serving node serving a second coverage area, a method of muting control information and bearer traffic received from a wireless communications device when the wireless device has moved from the first coverage area to the second coverage area, the method comprising the steps of:

receiving control information and bearer traffic in the second access network controller from the wireless communications device;

for a duration of a connection between the wireless communications device and the second access network controller, transmitting the control information received from the wireless communications device from the second access network controller to the first serving node for processing, wherein the bearer traffic is not transmitted to the first serving node and wherein the first serving node is the node through which the connection was established; and transmitting the bearer traffic from the second access network controller to the gateway node, wherein the control information received from the wireless communications device is not transmitted to the gateway node.

2. The method of claim 1 wherein the step of transmitting the control information received from the wireless communications device from the second access network controller to the first serving node for processing comprises transmitting the control information directly to the first serving node.

3. The method of claim 1 wherein the step of transmitting the control information received from the wireless communications device from the second access network controller to the first serving node for processing comprises transmitting the control information to the first serving node via the second serving node.

4. The method of claim 1 wherein the step of transmitting the bearer traffic from the second access network controller to the gateway node comprises the step of transmitting the bearer traffic from the second access network controller to the second serving node and transmitting the bearer traffic from the second serving node to the gateway node.

5. The method of claim 1 wherein the step of transmitting the bearer traffic from the second access network controller to the gateway node comprises transmitting the bearer traffic directly from the second access network controller to the gateway node.

6. In infrastructure equipment comprising a gateway node, a first access network controller and a first serving node serving a first coverage area and a second access network controller and a second serving node serving a second coverage area, a method of routing control information and bearer traffic to a wireless communications device when the wireless device has moved from the first coverage area to the second coverage area, the method comprising the steps of:

for a duration of a connection between the wireless communications device and the second access network controller, transmitting control information received from the gateway node to the first serving node;

transmitting the control information received from the gateway node from the first serving node to the second access network controller;

transmitting the bearer traffic from the gateway node to the second access network controller wherein the bearer traffic is not transmitted to the first serving node;

transmitting the control information and bearer traffic to the wireless communication device; and wherein control information transmitted by the gateway node is not transmitted to the second serving node.

7. The method of claim 6 wherein the step of transmitting the bearer traffic from the gateway node to the second access network controller comprises transmitting the bearer traffic from the gateway node to the second serving node and transmitting the bearer traffic from the second serving node to the second access network controller.

* * * * *